(12) United States Patent
Walker

(10) Patent No.: US 7,122,118 B2
(45) Date of Patent: Oct. 17, 2006

(54) APPARATUS FOR TREATMENT OF CONTAMINATED LIQUIDS

(75) Inventor: William Walker, Kallaroo (AU)

(73) Assignee: OED Occtech Limited, Subiaco East (AU)

( * ) Notice: Subject to any disclaimer, the term of this patent is extended or adjusted under 35 U.S.C. 154(b) by 0 days.

(21) Appl. No.: 10/494,029

(22) PCT Filed: Nov. 9, 2001

(86) PCT No.: PCT/AU01/01457

§ 371 (c)(1),
(2), (4) Date: Apr. 29, 2004

(87) PCT Pub. No.: WO03/037476

PCT Pub. Date: May 8, 2003

(65) Prior Publication Data

US 2005/0016918 A1    Jan. 27, 2005

(30) Foreign Application Priority Data

Nov. 2, 2001  (AU) ..................................... PR8620

(51) Int. Cl.
*B01D 21/02* (2006.01)

(52) U.S. Cl. .................... 210/194; 210/512.1; 210/519; 210/523; 210/532.1; 210/534

(58) Field of Classification Search ................ 210/194, 210/195.1, 253, 512.1, 519, 523, 532.1, 534, 210/535, 540
See application file for complete search history.

(56) References Cited

U.S. PATENT DOCUMENTS

| | | | | |
|---|---|---|---|---|
| 1,908,102 A | * | 5/1933 | Arledter ..................... | 210/535 |
| 1,919,653 A | * | 7/1933 | Hill .......................... | 210/512.1 |
| 2,180,811 A | * | 11/1939 | King ........................ | 210/512.1 |
| 2,273,271 A | * | 2/1942 | Kerns ......................... | 210/535 |
| 2,874,118 A | * | 2/1959 | Albertsen ................ | 210/512.1 |
| 3,239,066 A | * | 3/1966 | Schick ........................ | 210/519 |
| 3,399,775 A | * | 9/1968 | Ciaffone .................... | 210/535 |
| 4,451,366 A | | 5/1984 | Smisson | |
| 4,532,034 A | | 7/1985 | Hans et al. | |
| 4,747,962 A | | 5/1988 | Smisson | |
| 5,124,034 A | * | 6/1992 | Maness ..................... | 210/536 |
| 5,188,238 A | | 2/1993 | Smisson et al. | |
| 5,716,519 A | * | 2/1998 | Schleife et al. ............. | 210/519 |

(Continued)

FOREIGN PATENT DOCUMENTS

AU        777426    *    2/2001

(Continued)

*Primary Examiner*—Christopher Upton
(74) *Attorney, Agent, or Firm*—Duane Morris LLP

(57) ABSTRACT

A treatment vessel for separating contaminants from a base liquid is provided. The vessel comprises a first cylindrical portion, a frusto-conical portion, a second cylindrical portion and a conical portion, the conical portion having a bottom outlet arranged to discharge heavy contaminants from the vessel. Over time, the heavy contaminants settle on the sides of the conical and frusto-conical portions. In order to remove the settled contaminants, the vessel is provided with at least one clarified liquid inlet disposed at or proximate to the frusto-conical portion. The clarified liquid is sourced from either the treatment vessel itself, or another treatment vessel in the same system. The clarified liquid is reintroduced into the vessel in a manner so as to cause a downward circular flow to scour out the frusto-conical portion and the conical portion so as to assist in removal of heavy contaminants that settle on the sides thereof.

8 Claims, 2 Drawing Sheets

U.S. PATENT DOCUMENTS 5,804,062 A * 9/1998 Wyness ................... 210/532.1

FOREIGN PATENT DOCUMENTS

| AU | 200050525 | 2/2001 | |
| SU | 806065 | * | 2/1981 |
| SU | 1301450 | * | 4/1987 |

* cited by examiner

APPARATUS FOR TREATMENT OF CONTAMINATED LIQUIDS

FIELD OF THE INVENTION

The present invention relates to an apparatus for treatment of contaminated liquids particularly, but not exclusively, treatment of industrial, agricultural and municipal effluent.

BACKGROUND OF THE INVENTION

Vessels for separating contaminants from liquids are well known in the art and are generally in the form of a cylindrical tank with a conical bottom, where the apex of the conical bottom is lower than the outer side thereof.

Inlets may be positioned so as to produce a spiral flow of the liquid in the vessel and outlets may be positioned at the bottom, top and sides of the vessel to enable the drawing off of various fractions of the separated liquid stream, depending on its relative specific gravity.

For the purposes of this specification, a vessel or vessels of aforementioned type will be hereinafter referred to as a "treatment vessel" or "treatment vessels".

The inlet of a treatment vessel is typically situated at the outer edge of the treatment vessel, and is typically arranged in such a manner so as to introduce liquid tangentially and thereby create laminar, spiral flow within the treatment vessel. As the liquid nears the centre of the treatment vessel, the speed decreases and the direction of the flow is changed to a vertical up and down flow towards the top and bottom outlets.

It is preferred that no spiral flow takes place at the centre part of the treatment vessel so as to allow the contaminants to separate.

Separation takes place within the treatment vessel as the speed of flow slows toward the centre of the treatment vessel. Thus, while contaminants are suspended at the rate of flow at the outer part of the treatment vessel, these will be released as the speed of flow decreases toward the centre of the treatment vessel and will separate into their fractions depending on their specific gravity.

Separation can be aided by the prior addition of a variety of chemical substances. The methods for introducing contaminated liquids tangentially into a treatment vessel so as to produce spiral flows and the methods for operating such treatment vessels are well known.

It is often the practice to use more than one treatment vessel within a single separator system where more than one operation is required within the separator system. Thus, one treatment vessel may be used for removing those contaminants where the specific gravity of the contaminants is heavier than the carrying liquid, and another treatment vessel may be used to concentrate the contaminants removed.

A problem with existing treatment vessels used in separator systems is that the heaviest contaminants are directed downward toward the apex of the conical bottom of the treatment vessel and can build up a plug which does not flow out of the treatment vessel as desired.

The inventor of the present invention has previously provided a method of mitigating plugging of the bottom outlet of the treatment vessel by reintroducing clarified liquid obtained from a treatment vessel within the separator system in a manner so as to produce a downward spiral flow to scour out the conical portion of the treatment vessel. However, it has been found that the effectiveness of the method over prolonged periods of time can sometimes be compromised by the formation of "rat-holes" within the settling sediment, since upon its mechanical removal the sediment adheres to the walls of the conical portion. Further, access to the bottom portion of the treatment vessel for maintenance and cleaning, in the eventuality of "rat-hole" formation can sometimes be very difficult.

The present invention seeks to mitigate the possibility of "rat-holing" and subsequent plugging in treatment vessels by the separation of heavy contaminants therein and which increases the efficiency of operation of same beyond that of prior treatment vessels and clarifiers.

SUMMARY OF THE INVENTION

In accordance with a first aspect of the present invention there is provided a treatment vessel for separating contaminants from a base liquid treated therein, the treatment vessel comprising:

a first cylindrical portion;

a frusto-conical portion adjacent a lower end of the first cylindrical portion; and a base portion comprising a second cylindrical portion adjacent a lower end of the frusto-conical portion and a conical portion adjacent a lower end of the second cylindrical portion, the conical portion having a bottom outlet arranged to discharge heavy contaminants from the treatment vessel;

a clarified liquid source derived from the treatment vessel or another treatment vessel in a treatment system; and at least one clarified liquid inlet disposed at a side of the treatment vessel to reintroduce clarified liquid into the treatment vessel from the clarified liquid source at, or proximate to, the frusto-conical portion thereof;

wherein, in use, the clarified liquid is reintroduced in a manner so as to cause a downward circular flow to scour out the frusto-conical portion and the conical portion of the base portion and assist in removing heavy contaminants that accumulate adjacent the bottom outlet of the treatment vessel.

In accordance with a second aspect of the present invention, there is provided a treatment system for separating contaminants from a base liquid treated therein, the system comprising;

a plurality of treatment vessels each including a frusto-conical portion and a base portion comprising a second cylindrical portion adjacent a lower end of the frusto-conical portion and a conical portion adjacent a lower end of the second cylindrical portion, the conical portion having a bottom outlet arranged to discharge heavy contaminants from the treatment vessel;

at least one clarified liquid source derived from one or more of the treatment vessels, a clarified liquid inlet disposed at a side of the or each treatment vessel to re-introduce the clarified liquid into the treatment vessel from one of the clarified liquid sources at, or proximate to, the frusto-conical portion thereof;

wherein, in use, the clarified liquid is reintroduced in a manner so as to cause a downward circular flow to scour out the frusto-conical portion and the conical portion of the base portion and assist in removing the heavy contaminants that accumulate at a bottom outlet of the treatment vessel.

BRIEF DESCRIPTION OF THE DRAWINGS

The present invention will now be described, by way of example, with reference to the accompanying drawings, in which.

DETAILED DESCRIPTION OF THE INVENTION

Figure 1:
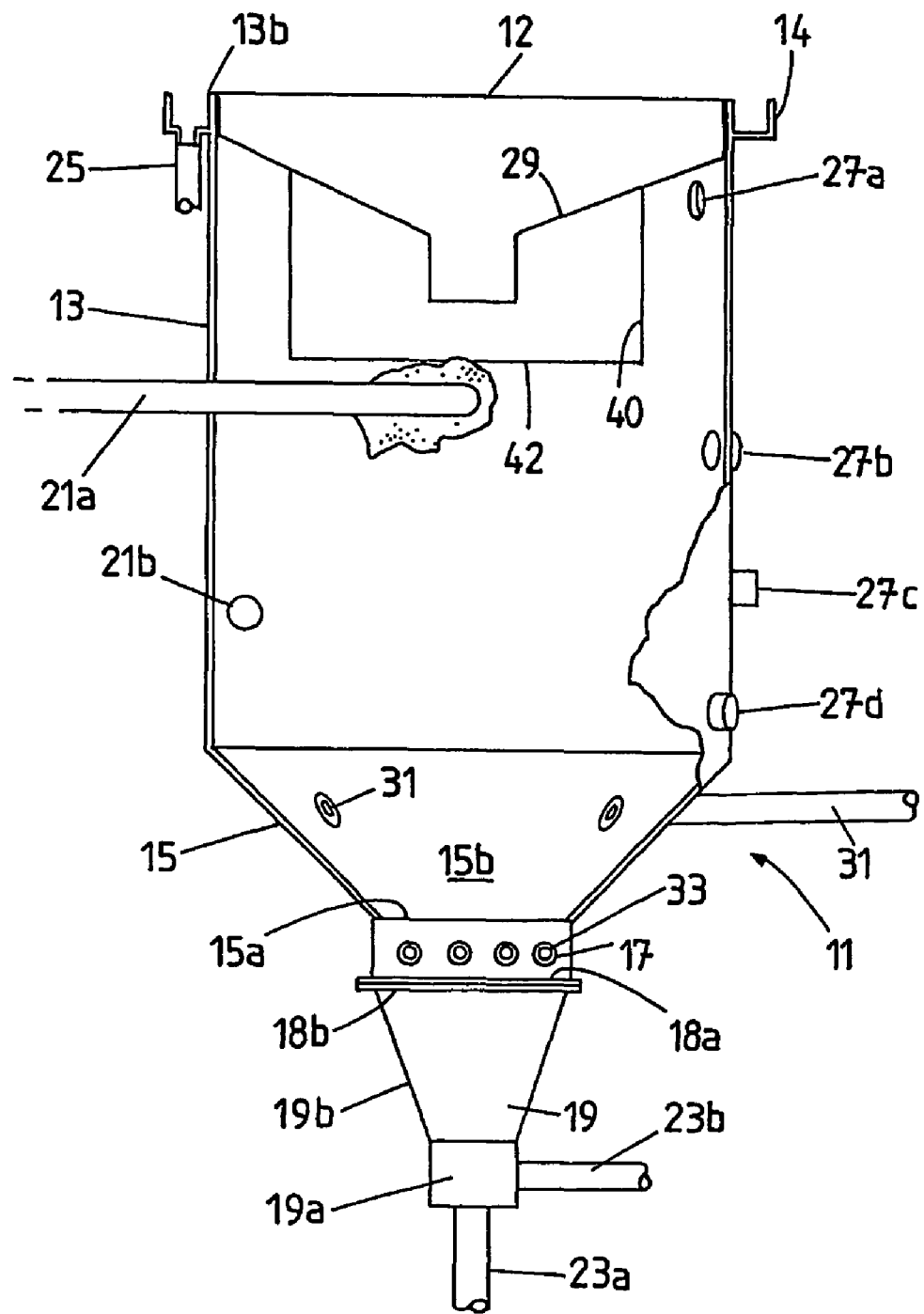
FIG. 1 is a cross sectional side elevation of the vessel in accordance with the first and second aspect.

Referring to the Figures, wherein like numerals and symbols refer to like parts throughout, there is shown a treatment vessel 11. The first and second aspects of the present invention are directed towards a separator system using one or more treatment vessels 11.

The treatment vessel 11 comprises a right circular first cylindrical portion 13 having a frusto-conical portion 15 at a lower end thereof, and a right circular second cylindrical portion 17 having a conical portion 19 at a lower end thereof.

The frusto-conical portion 15 has an apex 15a lower than the side 15b thereof. The second cylindrical portion 17 is integral with the apex 15a, the diameter of the second cylindrical portion 17 being coincident with the diameter of the apex 15a. The conical portion 19 has an apex 19a lower than the side 19b thereof.

The height of the first cylindrical portion 13 is preferably no more than one and a half times the diameter of the first cylindrical portion 13.

The diameter of the second cylindrical portion 17 is preferably from about 22% to about 40% of the diameter of the first cylindrical portion 13.

The angle of inclination of side 19b is preferably twice the angle of inclination of side 15b. Preferably, the angle of inclination of side 19b is about 60° and the angle of inclination of side 15b is about 30°.

In a preferred embodiment of the invention, the conical portion 19 is removable from the treatment vessel 11. To this purpose, a lower edge of the second cylindrical portion 17 is preferably provided with a flange member 18a and an upper edge of the conical portion 19 is provided with a complementary flange member 18b for mating thereof. The flange members 18a, 18b are fixed together with conventional fixing means.

A top 12 of the first cylindrical portion 13 is open and has an annular gutter 14 disposed around an upper edge 13b of the first cylindrical portion 13, the latter defining an intermediate lip between the annular gutter 14 and the top 12 of the first cylindrical portion 13. In an alternative embodiment of the invention, the annular gutter 14 is disposed around an inside upper edge of the first cylindrical portion 13. Inlets 21 for the vessel 11, defined by a pair of conduits 21a and 21b, are tangentially disposed at the side of the first cylindrical portion 13 to introduce contaminated base liquid into the vessel 11 so as to produce a spiral flow of liquid within the treatment vessel 11. The conduits 21a and 21b are spaced apart from each other vertically, with the conduit 21a disposed approximately midway along the length of the first cylindrical portion 13 of the treatment vessel 11, and the conduit 21b disposed proximate to midway between the conduit 21a and the top of the frusto-conical portion 15 of the treatment vessel 11. Furtherstill, the openings of the conduits 21a and 21b are angularly spaced apart around the circumference of the first cylindrical portion 13 by approximately 90° as shown in FIG. 1 of the drawings.

It will be understood that in an alternative embodiment of the invention the vessel 11 is provided with only one inlet 21 tangentially disposed at the side of the first cylindrical portion 13 to introduce contaminated base liquid into the vessel 11 so as to produce a spiral flow of liquid within the treatment vessel 11.

A plurality of different sets of outlets are provided for the treatment vessel 11. Bottom outlets 23 are disposed at the apex 19a and are defined by a pair of conduits 23a and 23b for discharging liquid through the apex 19a from the treatment vessel 11. An upper outlet 25 (or set of outlets not shown) is provided proximate to the top 12 of the treatment vessel 11 and is defined by a conduit connected to a bottom of the annular gutter 14 in order to discharge liquid therefrom.

A further set of outlets 27 are disposed about the periphery of the first cylindrical portion 13 intermediate the top 12 and bottom of the first cylindrical portion 13. These outlets in the present embodiment are defined by four conduits 27a, 27b, 27c and 27d which are axially spaced apart along the treatment vessel 11 to discharge different fractions of the liquid from within the treatment vessel 11, depending upon the relative specific gravity thereof, as will be described in more detail later.

Preferably, the vessel 11 is provided with flow modifying means 29 comprising a pair of centrally disposed vanes 29a, 29b adjacent the top of the first cylindrical portion 13. In the present embodiment, two vanes 29a and 29b are disposed in an orthogonally intersecting relationship. The radial extent of the vanes 29a, 29b increases progressively towards the circumference of the first cylindrical portion 13 as shown in FIG. 1, as the vane 29 extends axially towards the top 12 of the vessel 11. The vanes 29a, 29b are fixedly mounted to the inner wall of the first cylindrical portion 13 at the outer radial ends of the fully extended radial portion thereof for fixedly disposing the flow modifying means 29 within the treatment vessel 11.

Preferably, the vessel 11 is also provided with a cylindrical skirt 40 depending from adjacent outer radial ends of the flow modifying means 29, as shown in FIG. 1. A lowermost edge 42 of the cylindrical skirt 40 is disposed adjacent the uppermost of the pair of conduits 21a and 21b. The purpose of the cylindrical skirt 40 is to encourage flow of separated liquid, containing light weight contaminants in the form of flotation material, to be drawn up an outer side of the cylindrical skirt 40 so as to be discharged through the uppermost outlet 27a.

Figure 2:
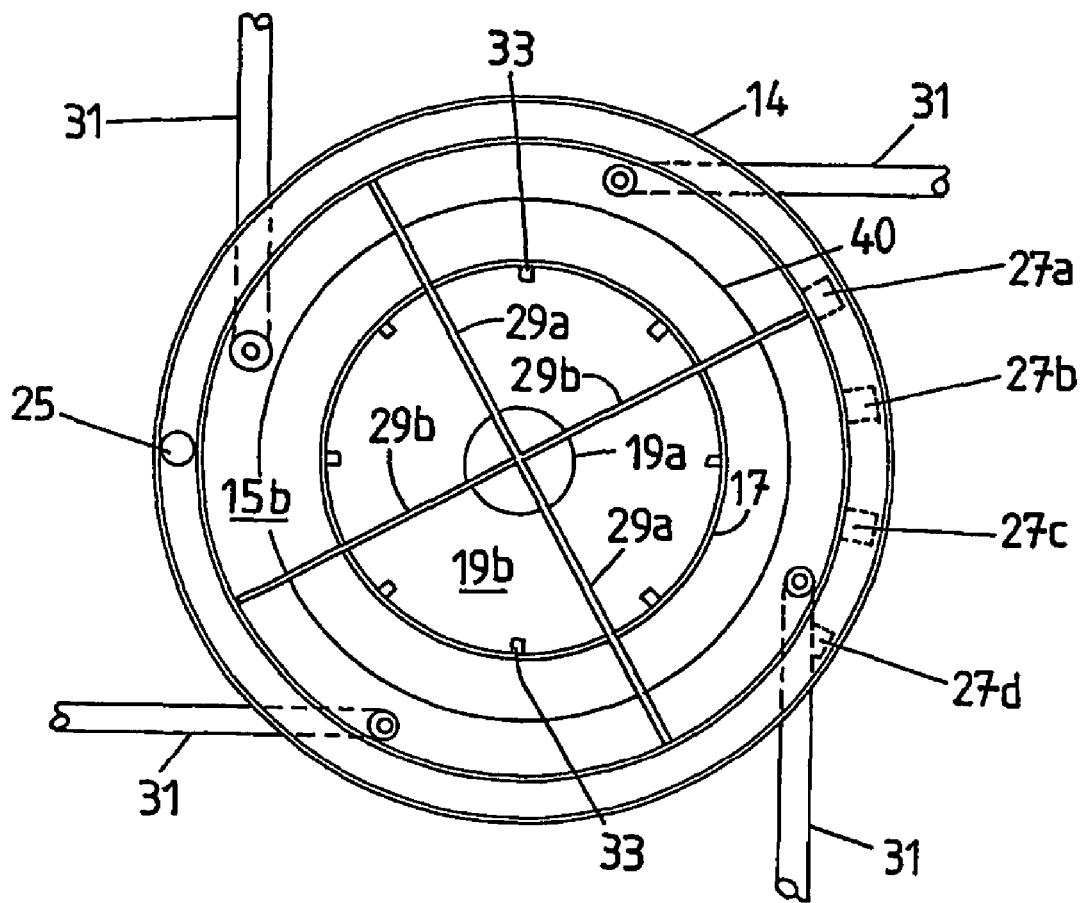
FIG. 2 is a plan view of FIG. 1.

In FIGS. 1 and 2 there are shown a plurality of first clarified liquid inlets 31 disposed at the side of the treatment vessel 11 proximate to the frusto-conical portion 15 in a tangential manner so as to reintroduce the clarified liquid into the treatment vessel 11 tangentially in this region. The first inlets 31 are connected to a clarified liquid source being a branch from one or more of the outlet conduits 27a, 27b, 27c or 27d of another treatment vessel 11 provided in the separator system or the upper outlet 25 of the same treatment vessel 11.

As can be seen in FIGS. 1 and 2, the first inlets 31 are spaced equiangularly around the side 15b of the frusto-conical portion 15 at a position intermediate the top of the frusto-conical portion 15 and the apex 15a Furthermore, the first inlets 31 are oriented slightly lower at ends adjacent the treatment vessel 11 so that clarified liquid introduced into the treatment vessel 11 therethrough is directed with a downward directional component towards the apex 15a of the frusto-conical portion 15 in a manner to be described in more detail later.

In FIGS. 1 and 2 there are shown a plurality of second clarified liquid inlets 33 disposed at the side of the treatment vessel 11 proximate to the second cylindrical portion 17. The second inlets 33 are oriented in a downward longitudinal manner so as to reintroduce the clarified liquid into the treatment vessel 11 longitudinally in this region. The second inlets 33 are connected to a clarified liquid source being a branch from one or more of the outlet conduits 27a, 27b, 27c or 27d of another treatment vessel 11 provided in the separator system or the upper outlet 25 of the same treatment vessel 11.

As can be seen in FIGS. 1 and 2, the second inlets 33 are spaced equiangularly around the second cylindrical portion 17 at a position intermediate the top and the bottom of the second cylindrical portion 17.

In a preferred embodiment of the present invention the first and second inlets 31, 33 are spray nozzles which reintroduce the clarified liquid into the treatment vessel 11 under pressure. Typically, for example, each spray nozzle would reintroduce clarified liquid into the treatment vessel 11 at a flow rate of 17 L/minute at a pressure of 68 kPa. It will be understood that the number of first and second inlets 31, 33 provided to the treatment vessel 11, and the flow rate and pressure under which they operate will vary according to the size of the treatment vessel 11 and the sedimentary characteristics of the contaminated liquids introduced into the treatment vessel 11 for treatment.

The separator system of FIGS. 1 and 2 comprises one or more treatment vessels 11, as described above. Accordingly, the conduits 31a and 31b are connected either to a clarified liquid source being a branch from one or more of the outlet conduits 27a, 27b, 27c or 27d from a treatment vessel 11 disposed subsequently in the series of treatment vessels 11 constituting the separator system, the upper outlet 25 of the same treatment vessel 11, or both.

Now describing the manner of operation of the separator system, contaminated base liquid is supplied to a treatment vessel via the inlets 21.

In the case of a single treatment vessel separator system, the inlets 21 are connected to some contaminated base liquid source and the outlets 25 provide different fractions of the clarified decontaminated base liquid.

In the case of the separator system comprising a plurality of treatment vessels 11, the treatment vessels 11 are connected in series so that the inlets 21 of all subsequent treatment vessels 11 are connected to one or more of the outlets 27 or a preceding treatment vessel 11—or in the case of a preceding treatment vessel dedicated to treating a low volume of light contaminants, to the upper outlet 25 and/or in the case of a preceding vessel dedicated to treating a low volume of heavy contaminants, to the bottom outlet 23b additionally or alternatively to the outlets 27. Thus, the outlets 27 of all preceding treatment vessels 11 in the series are connected to the inlets 21 of a subsequent treatment vessel 11, additionally and/or alternatively to the outlets 25 and 23b, depending upon whether the treatment vessel 11 is dedicated to handling low volumes of light or heavy contaminants, respectively.

In the interests of risk management, it is preferable that the separator system comprise a plurality of treatment vessels 11 connected in series as described previously, wherein the series of connected vessels 11 are themselves connected in a parallel configuration. In this way, the failure of one treatment vessel 11 will not entirely interrupt process control within the system. Furthermore, a parallel configuration of several serially connected treatment vessels 11 allows for operational flexibility in that one or more vessels 11 can be readily added or subtracted from the system to account for volume capacity changes in a treatment plant.

The tangential positioning of the inlets 21 is provided to introduce base liquid containing heavy and light contaminants into the treatment vessel 11 in a tangential manner so as to produce a circular flow therein. Frictional forces between the circulating flows and the internal surfaces of the treatment vessel 11 produce laminar flows within the circulating liquid which facilitate the displacement of the heavy and light contaminants, under gravity, through the liquid. Heavy contaminants, having a relative specific gravity greater than that of the residual decontaminated base liquid, travel down towards the apex 19a or the conical portion 19, whilst light contaminants, having a specific gravity lighter than the contaminated base liquid, travel upward towards the top 12 of the treatment vessel 11.

This separation of heavy and light contaminants allows relatively clarified, decontaminated base liquid to remain midway between the top and bottom of the first cylindrical portion 13, allowing this to be drawn off and discharged via the outlets 27. As described, the outlets 27 are spaced apart axially of each other to enable different fractions of clarified decontaminated base liquid to be drawn off from the treatment vessel 11. In this way, the treatment vessel 11 of the present invention affords a threefold separation of heavy contaminants, light contaminants such as in the form of flocculatory material, and clarified decontaminated base liquid.

Importantly, the first clarified liquid inlets 31 reintroduce clarified liquid to the treatment vessel 11 in a tangential manner, so as to circulate the liquid containing heavy contaminants proximate to the frusto-conical portion 15 of the treatment vessel 11 in a downward direction which causes a downward circular flow of liquid to scour out the frusto-conical portion 15 and assist in removing the heavy contaminants accumulating at the bottom outlet 23 of the treatment vessel 11.

Further, the removal of heavy contaminants which accumulate at the bottom outlet 23 of the treatment vessel 11 is also assisted by reintroduction of clarified liquid through the second inlets 33 in a downward direction to scour out the conical portion 19.

In this way, plugging of the apex 19a and hence the bottom outlets 23 is avoided by fluidising the heaviest contaminants continuously, enabling them to flow through one or other of the outlets 23a or 23b, which ever is connected into the system.

The scouring action produced by the flow of reintroduced clarified liquid is further assisted by the force of the flow of clarified liquid as it is reintroduced into the treatment vessel 11 under pressure through the spray nozzles at inlets 31, 33.

Furthermore, the accumulation of sediments on the frusto-conical portion 15 and the conical portion 19 through "rat-holing" over prolonged periods of time is minimised by the augmentation of the treatment vessel 11 with the second cylindrical portion 17 and the conical portion 19, particularly since the angle of inclination of side 19b is greater than the angle of inclination of side 15b.

In the preferred embodiment of the invention, the conical portion 19 can be easily removed by loosening the fixing means which hold flange members 18a, 18b together, thus providing ease of access to the frusto-conical portion 15 of the treatment vessel 11 and the second cylindrical portion 17, and the conical portion 19 for maintenance and cleaning purposes.

It should be appreciated that the scope of the present invention is not limited to the particular embodiments herein described and that minor modifications or changes to the vessel design are envisaged to fall within the scope of the present invention and do not depart from the spirit of the same.

What is claimed is:

1. A treatment vessel for separating contaminants from a base liquid treated therein, the treatment vessel comprising:
   a first cylindrical portion;
   a frusto-conical portion adjacent a lower end of the first cylindrical portion;
   a second cylindrical portion adjacent a lower end of the frusto-conical portion;
   a conical portion adjacent a lower end of the second cylindrical portion, the conical portion having a bottom outlet arranged to discharge heavy contaminants from the treatment vessel;
   a clarified liquid source derived from the treatment vessel or another treatment vessel in a treatment system; and
   a plurality of first clarified liquid inlets disposed at a side of the treatment vessel to reintroduce clarified liquid into the treatment vessel from the clarified liquid source at the frusto-conical portion thereof;
   such that, in use, the clarified liquid is reintroduced in a manner so as to cause a downward circular flow to scour out the frusto-conical portion and the conical portion and to assist in removing heavy contaminants that accumulate adjacent the bottom outlet of the treatment vessel;
   wherein the treatment vessel is further provided with a plurality of second clarified liquid inlets disposed at a side of the treatment vessel to reintroduce clarified liquid into the treatment vessel from the clarified liquid source at the second cylindrical portion thereof;
   such that, in use, the clarified liquid is reintroduced in a manner so as to cause a downward flow to scour out the conical portion and to assist in removing heavy contaminants that accumulate adjacent the bottom outlet of the treatment vessel.

2. The treatment vessel according to claim 1, characterized in that the first and second clarified liquid inlets are spaced equiangularly around the frusto-conical portion and the second cylindrical portion, respectively.

3. The treatment system according to claim 2, characterized in that the first and second clarified liquid inlets are spray nozzles.

4. The treatment vessel according to claim 1, characterized in that the first and second clarified liquid inlets are spray nozzles.

5. The treatment vessel according to claim 1, characterized in that the angle of inclination of a side of the conical portion is about twice the angle of inclination of a side of the frusto-conical portion.

6. The treatment vessel according to claim 5, characterized in that the angle of inclination of the side of the conical portion is about 60° and the angle of inclination of the side of the frusto-conical portion is about 30°.

7. The treatment vessel according to claim 1, characterized in that the diameter of the second cylindrical portion is from about 22% to about 40% of the diameter of the first cylindrical portion.

8. The treatment vessel according to claim 1, characterized in that the conical portion is removable from the treatment vessel.

* * * * *